J. T. HENRY.
Grinding-Wheels.

No. 149,929. Patented April 21, 1874.

WITNESSES:

INVENTOR:
BY
ATTORNEYS.

UNITED STATES PATENT OFFICE.

JOHN T. HENRY, OF HAMPDEN, ASSIGNOR TO HIMSELF AND JOSEPH MUNGER, OF WATERBURY, CONNECTICUT.

IMPROVEMENT IN GRINDING-WHEELS.

Specification forming part of Letters Patent No. 149,929, dated April 21, 1874; application filed November 1, 1873.

To all whom it may concern:

Be it known that I, JOHN T. HENRY, of Hampden, in the county of New Haven and State of Connecticut, have invented a new and useful Improvement in the Manufacture of Solid Emery-Wheels, of which the following is a specification:

Grindstones or emery-wheels have been attached to their arbors by means of clamping-disks having circular ribs fitting into corresponding grooves or recesses in the parallel sides of the stones or wheels. The effect of this arrangement is, obviously, to weaken their cohesive force, and thereby reduce their power of resisting centrifugal force. To remedy this defect, and form a yet more secure and durable attachment of a stone or wheel to its arbor, I cut or form the same thicker at the center, or around the central opening, and provide circular shoulders to engage with corresponding shoulders on the clamps or disks, as hereinafter more fully described.

Figure 1:
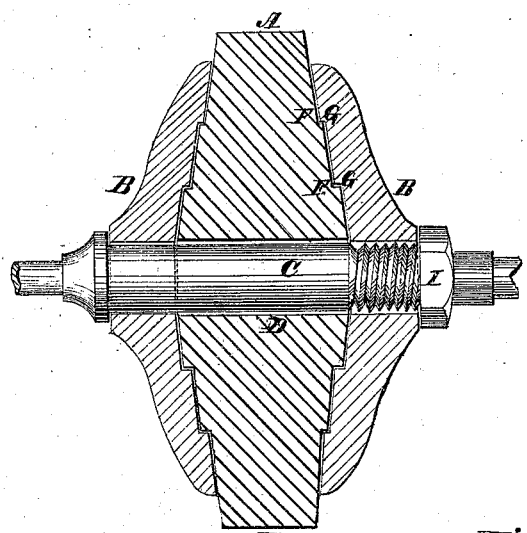
Figure 2:
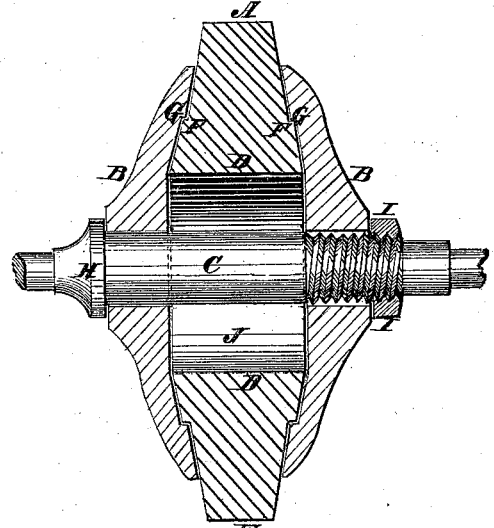
Figure 3:
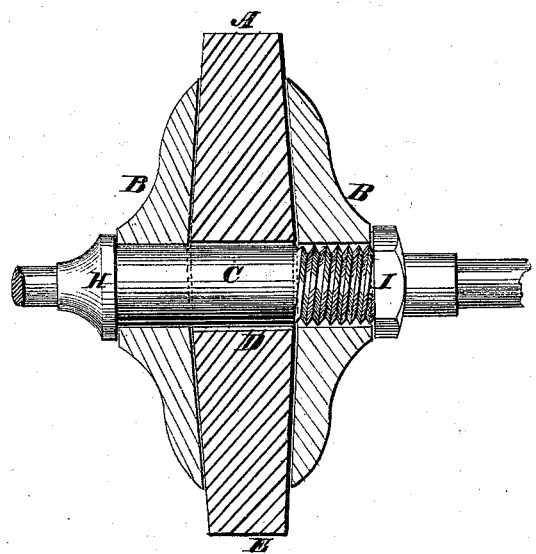

In the accompanying drawing, Figures 1, 2, and 3 are vertical sections of solid emery-wheels constructed according to my invention, showing the clamps or flanges and arbors, all arranged as when the wheels are ready for use.

Similar letters of reference indicate corresponding parts.

A represents the wheel; B B, the clamps or flanges; C, the arbor. The wheel is made solid, of the usual materials, and diminishes in thickness from the inner surface D to the periphery E. This diminution of thickness may be more or less; but I have found that about one inch to the foot, or in that proportion, on each side of the wheel is about right. Emery-wheels are made to revolve with great rapidity, and solid emery-wheels are very liable to burst from centrifugal force, occasioning serious accidents and loss of life in many cases. To lessen the weight of large wheels and render such accidents less likely to occur, if not impossible, and also for the purpose of lessening the cost of such wheels, I form the wheel with a portion of the center left out, thus leaving a recess of greater or less extent around the arbor, as seen in Fig. 2 at J. On one or both sides of the wheel, I form one or more shoulders or offsets, F, and I make the clamps or flanges with corresponding shoulders G, to fit as seen in Figs. 1 and 2, the effect of which is to resist the centrifugal force, and hold the wheel together, and also to support the wheel in a central position around its axis. With these shoulders, one or more, the wheel is at once centered by the clamps or flanges without reference to the arbor. The clamps or flanges, of course, snugly fit the arbor. One bears against the collar H, while the other is forced up and tightly clamps the wheel by the nut I.

Having thus described my invention, I claim as new and desire to secure by Letters Patent—

The combination of the clamping-disks D and the wheel A, enlarged or thickened around its axis, as shown and described, for the purpose specified.

JOHN T. HENRY.

Witnesses:
ELIZA B. HENRY,
FANNIE A. HENRY.